United States Patent Office 3,651,087
Patented Mar. 21, 1972

3,651,087
DIBENZOTHIAZEPINE ETHER INTERMEDIATES
Abraham Weber, Paris, and Jacques Jean Frossard, Champigny, France, assignors to Mead Johnson & Company
No Drawing. Original application Aug. 3, 1967, Ser. No. 657,785, now Patent No. 3,519,633, dated July 7, 1970. Divided and this application Mar. 18, 1970, Ser. No. 18,774
Int. Cl. A61k 27/00; C07d 93/42
U.S. Cl. 260—327 B
4 Claims

ABSTRACT OF THE DISCLOSURE

Novel compounds of Formula I having antihistaminic and other pharmacological activity

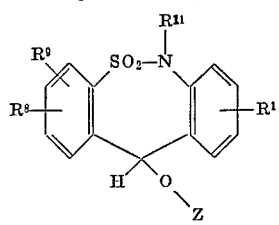

Formula I

This invention is concerned with a novel group of chemical substances having antihistaminic and other pharmacologic activities, and intermediates for their preparation.

---

This application is a divsision of S.N. 657,785, filed Aug. 3, 1967, now U.S. Pat. No. 3,519,633, patented July 7, 1970.

The novel compounds of this invention embody the 5,11 - dihydro - 10,10-dioxo-dibenzo[c,f][1,2]thiazepine ring system which is a novel ring system invented by the present inventors and first disclosed in their copending application, U.S. Ser. No. 599,737 filed Dec. 7, 1966, now U.S. Pat. No. 3,542,790, patented Nov. 24, 1970. The hypothetical compound representative of this ring structure is shown in Formula II in which the ring positions are numbered to facilitate the naming of the various substances with reference to their structural formulas.

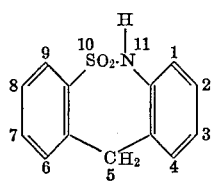

Formula II

The pharmacologically active compounds of the present invention are represented by Formula I which is drawn above. In this formula $R^1$, $R^8$, and $R^9$ are substituents attached to the phenyl portions of the ring structure. More specifically, $R^1$ is located in any of the 1, 2, 3 or 4 positions and is either hydrogen, chlorine, bromine, iodine, fluorine or an alkyl or alkoxy group having 1 to 4 carbon atoms. $R^8$ and $R^9$ are ring substituents attached to the opposite phenyl ring, namely in any of the 6, 7, 8, or 9 positions. They are hydrogen, chlorine, fluorine, bromine, nitro, methoxy or methyl groups. $R^1$, $R^8$, and $R^9$ are each hydrogen atoms in preferred embodiments of the present invention. In other embodiments they may be the same or different. $R^{11}$ is an alkyl group of from 1 to 4 carbon atoms, preferably methyl.

Z represents the aminocarbinol structure from which the present ethers are derived. Z is an aminoalkyl group of Formula III in which Alk is an alkylene group of from 2 to 5 carbon atoms connecting the amino nitrogen atom to the ether oxygen atom through at least 2 carbon atoms. $R^5$ is alkyl of 1 to 4 carbon atoms and $R^6$ is hydrogen, or alkyl of 1 to 4 carbon atoms. $R^5$ and $R^6$ may be joined to form a ring structure which includes the nitrogen atom to which they are attached, such as a pyrrolidino, piperidino, morpholino, thiamorpholino, or 4-$R^6$-piperazino group.

Formula III

Alternatively, Z may be a nitrogen heterocycle bonded through either a ring or side chain carbon atom thereof in such fashion that the hetrocyclic nitrogen atom is connected to the oxygen atom through at least 2 carbon atoms. Examples of such hetrocyclic representatives of the amino carbinol substituent include 1-methyl-3-pyrrolidylmethyl, 3 - tropyl, 1 - methyl-1,4,5,6-tetrahydro-2-pyrimidylmethyl, 1-methyl-4-piperidyl, 3-quinuclidinyl, and others.

The substances of Formula I are basic compounds by virtue of the amino nitrogen atom of the Z substituent. They thus form stable salts with various acids. The pharmacologically acceptable acid addition salts are preferred. The pharmacologically acceptable acid addition salts are those in which the anion of the salt makes no significant contribution to the toxicity of the compound as a whole in the doses in which they are administered to achieve the desired pharmacological effect.

The salts are prepared in conventional fashion by reaction of one of the compounds of Formula I with an acid. For the preparation of salts with mono-basic acids, use of 1 molecular proportion of each reactant is convenient. In the formation of salts of poly-basic acids, it is sometimes desirable to reduce the molecular ratio of the acid so that but one chemical equivalent thereof is employed per chemical equivalent of a compound of Formula I. Generally speaking, the salts are most easily formed by carrying out the reaction in a solvent in which at least one and preferably both reactants are soluble. Pharmacologically acceptable acid addition salts may be prepared from the following acids: hydrochloric, hydrobromic, hydroiodic, acetic, propionic, benzoic, phosphoric, nitric, succinic, gluconic, mucic, sulfuric, methanesulfonic, ethanesulfonic, p-toluenesulfonic, citric, tartaric, pamoic, and tannic acids. Others are known to those skilled in the art and may also be employed.

The compounds of Formula I are antihistaminic, antispasmodic, anticholinergic and diuretic agents. To illustrate, N,N-dimethyl-2-(5,11-dihydro-10,10-dioxo-11-methyldibenzo[c,f] [1,2]thiazepin - 5 - yloxy)ethyl amine (Example 3) and 3-(5,11-dihydro-10,10-dioxo - 11 - methyldibenzo[c,f] [1,2]thiazepin-5-yloxy)tropane (Example 4) exhibit $ED_{50}$ values of 0.5 mg./kg. and less than 0.02 mg./kg. respectively in antagonism of the bronchoconstriction in guinea pigs treated intravenously with a lethal dose of histamine according to the method of Lish, et al. Arch. Int. Pharmacodyn. 129, 77 (1960). In the same test, diphenhydramine hydrochloride exhibits $ED_{50}=0.5$ mg./kg. Relative to their activity, these substances have a wide margin of safety. The acute toxicity $LD_{50}$ values measured in mice treated intraperitoneally are respectively 200 mg./kg. and 50 mg./kg.

The anti-cholinergic action of these substances is reflected by their activity in the anti-tremorine test of Everett, et al. Science 124, 79 (1956). Tremorine, 1,4-dipyrrolidinobut-2-yne, causes tremors of the head and limbs and salivation and lacrymation in mice treated intraperitoneally with the substance. The compound of Example 3 abolishes each of these effects at doses of about 25 mg./kg. The compound of Example 4 abolishes the head and limb tremors at a similar dose, but is substantially more active in abolishing salivation and lacrymation. This occurs at doses of less than 6.25 mg./kg.

The above properties of the latter substance, that is the product of Example 4, are even more clearly demonstrated by tests using isolated tissues. An intestinal segment, rat duodenum, is suspended in oxygenated Tyrode's solution and attached to a gravity writing lever and kymograph. Different concentrations of the test compound are added to the bath solution in a series of experiments and their effects in inhibiting the response of the tissue to spasms induced by acetylcholine or by barium chloride are recorded. That concentration which causes a return of the tissue tone to 75% of the normal value is then determined by interpolation from a dose response curve. It is referred to as the $EC_{75}$. The $EC_{75}$ value versus acetylcholine spasms is 0.15 mcg./ml. The $EC_{75}$ value versus barium chloride spasms is 10 mcg./ml. The substance is thus approximately equivalent to papaverine as an antispasmodic and about 1/30 as active as atropine as an anticholinergic.

Antihistaminic activity of this substance (Example 4) is demonstrated in a similar isolated tissue experiment employing the guinea pig trachea with histamine dihydrochloride, 0.4 mcg./ml. as the spasmogen. In this experiment the $IC_{75}$ value is 0.007 mcg./ml. That for diphenhydramine in the same type of experiment is 0.025 mcg./ml. The isolated tissue studies thus affirm that this substance possesses substantial antihistaminic, antispasmodic and anticholinergic action.

The method of Lipschitz et al., J. Pharmacol. Exp. Therap. 79, 97 (1943) was used to measure the diuretic action of the product of Example 3. Healthy rats weighing 150 to 200 g. each were fasted 18 hrs. prior to the experiment. Groups of eight rats each were used in the test. All animals were hydrated with 0.85% aqueous saline solution, 25 ml./kg. orally, at the outset of the experiment. The test drug was dissolved in saline and administered therewith to the test animals. Saline without test drug was administered to the control animals. The rats were placed in special metabolism cages without food or water for the duration of the experiment, 5 hrs. The volume of urine excreted by each group was measured and the electrolyte concentration, including sodium, potassium, and chloride, of the urine samples were determined. The results for doses of 25 mg./kg. are reported in the following table as percentages of the values observed for the saline controls for both the compound of Example 3 and for hydrochlorthiazide.

DIURETIC ACTION [1]

| Parameter | Example 3 [2] | Hydrochlorthiazide |
|---|---|---|
| Volume | 174 | 179 |
| Chloride | 160 | 213 |
| Sodium | 170 | 172 |
| Potassium | 119 | 146 |

[1] Percentages relative to saline controls; dose, 25 mg./kg.
[2] N,N,-dimethyl-2-(5,11-dihydro-10,10-dioxo-11-methyldibenzo[c,f] 1,2] thiazepin-5-yloxy)ethylamine hydrogen maleate.

The compounds of Formula I and their pharmacologically acceptable salts are active on oral administration. They may also be administered parenterally. Since some of the substances are more potent than others on a weight basis, the specific dose for various members of the class may vary. Applicable doses fall within the range of from about 0.02 mg./kg. to 25 mg./kg. of body weight of the host. The substances may be administered in conventional pharmaceutical forms including tablets and capsules for oral administration and suspensions and solutions for oral or parenteral administration. Total daily doses range from about 0.5 to 250 mg. 3-(5,11-dihydro-10,10-dioxo - 11 - methyldibenzo[c,f] [1,2]thiazepin-5-yloxy)tropane is one of the more potent substances of the present invention and is administered in doses ranging from about 0.5 to 5 mg. per day.

The compounds of Formula I are prepared by known methods for the synthesis of ethers of amino carbinols. These methods involve the reaction of a carbinol corresponding to one moiety of the ether with a reactive ester of the carbinol corresponding to the other. The carbinol having the formula Z—OH or a reactive ester thereof is chosen as one reactant and $R^1$, $R^8$, $R^9$, $R^{11}$-substituted-5,11-dihydro - 10,10 - dioxo-5-hydroxydibenzo[c,f] [1,2] thiazepine, or a reactive ester thereof as the case requires, is chosen as the other. This is illustrated in the following equations. The intermediate 5-hydroxy thiazepine and its reactive esters are pictured in Formulas IV and V. They are key intermediates and are considered part of the present invention. The symbols Z, $R^1$, $R^8$, $R^9$ and $R^{11}$ have the same meaning as before. X is the reactive ester group and refers specifically to chlorine, bromine, iodine, alkyl sulfate, alkyl sulfonates, aryl sulfate, aryl sulfonate, or alkyl phosphate, and contains up to about 12 carbon atoms.

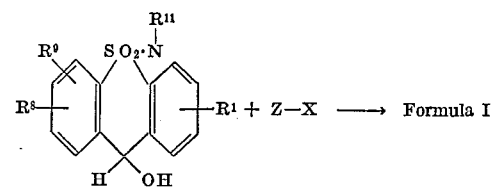

Formula IV

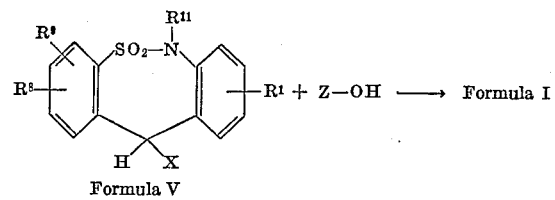

Formula V

FORMULA V

Elevated temperatures of the order of 80 to 150° C. with an inert organic solvent as reaction medium are employed both processes. Since the acid HX is a by-product, a base is provided for neutralization purposes. Most conveniently, excess aminoalkanol reactant Z—OH serves as base but tertiary amines and inorganic bases such as tributyl amine or potassium carbonate may be employed. When such other base is provided, equimolar proportions of the reactants and one or more molar proportions of base are used. When excess aminoalkanol serves as base, two or more molar proportions thereof are employed. In the case where carbinol Formula IV is employed it is usually advantageous to use a stronger base such as sodium amide. Formation of the sodium salt of the carbinol as a separate preliminary step is advisable in this instance.

The syntheses illustrated by these equations are best adapted to the preparation of products in which Z contains the tertiary amino group. Where a secondary amino alcohol or reactive ester thereof is employed in these processes, side reactions occur, involving alkylation of the secondary amino nitrogen atom. Desired secondary amino products of Formula I can, nevertheless, be synthesized by this method, and removed by known isolating procedures.

The Formula I secondary amino-types, i.e. those in which $R^6$ is hydrogen, are more conveniently prepared by operation on a tertiary amino product of Formula I, by means of various de-alkylation methods which are known to the art. For this purpose, a starting material is chosen which contains a Z-substituent having an $R^6$ group readily transformable into hydrogen rather than using the secondary amine itself. Such substituents are benzyl, benzhydryl, or triphenylmethyl, which are readily removed by hydrogenolysis, or carboacyl which can be removed by hydrolysis. Secondary amino products can also be obtained by displacement of an amino N-methyl group when $R^5$ or $R^6$ is methyl by reaction with cyanogen bromide or ethyl chloroformate to provide a cyano or carboacyl intermediate which on hydrolysis yields a product of Formula I. The intermediates of Formula V are preferred for the preparation of the products of Formula I since the reaction thereof with an amino carbinol reactant, as is pictured in the equation, takes place with more facility than the reverse procedure employing the hydroxyl intermediate of Formula IV.

The intermediate of Formula IV is prepared from the corresponding $R^1$, $R^8$, $R^9$, $R^{11}$-substituted-5,11-dihydro-5,10,10-trioxo-dibenzo[c,f][1,2]thiazepine, the latter having been obtained by methods described in the co-pending application of the present inventors referred to above, by any of a variety of known methods for the reduction of a ketone to a secondary alcohol. Catalytic methods as well as chemical methods are operable. In the application of catalytic techniques, mild conditions are selected to avoid loss of the hydroxyl group since it is predisposed to hydrogenolysis. The positional relationship of the 5—OH in Formula IV with respect to the phenyl rings is that of the OH in benzhydrol. This complication is obviated when chemical methods of a reduction are employed. Sodium borohydride is a particularly satisfactory reagent for the transformation.

The reactive esters of Formula V are prepared by known means from the alcohol of Formula IV. Reactions, for example, with HCl, HBr, HI, thionyl chloride, thionyl bromide, phosphorus triodide, methyl p-toluenesulfonate, methanesulfonylchloride, diethyl phosphate, triethyl phosphite, etc. are only a few of the known means available for preparation of reactive esters.

The foregoing synthetic processes are illustrated in the following examples.

EXAMPLE 1

5,11-dihydro-10,10-dioxo-5-hydroxy-11-methyl-dibenzo[c,f][1,2]thiazepine 5,11 - dihydro - 11 - methyl-5,10,10-trioxodibenzo[c,f]-[1,2]thiazepine, 16 g., is suspended at 300 ml. of methanol and treated drop-wise with a solution of 3 g. of sodium borohydride in water. The reaction mixture is kept at room temperature overnight, heated to dissolve precipitated material, acidified with 10% acetic acid and allowed to cool. The crystalline product is collected on a filter, washed with water and recrystallized from isopropanol, M.P. 138° C.

Analysis.—Calc'd for $C_{14}H_{13}NO_3S$ (percent): C, 61.07; H, 4.75; N, 5.08. Found (percent): C, 60.90; H, 4.22; N, 4.91.

EXAMPLE 2

5-chloro-5,11-dihydro-10,10-dioxo-11-methyl-dibenzo[c,f][1,2]thiazepine

A portion of the product of Example 1, 5 g., is dissolved in 50 ml. of benzene and the solution is saturated with hydrogen chloride. External cooling is supplied in order to maintain the temperature near room temperature. The product crystallizes from the solution during this process. The mixture is kept at room temperature for one hour and the product is collected on a filter, yield 5 g.; M.P. 224–225° C. This material is purified by recrystallization from toluene, M.P. 230° C.

Analysis.—Calc'd for $C_{14}H_{12}ClNO_2S$ (percent): N, 4.79; S, 10.93. Found (percent): N, 4.53; S, 10.85.

EXAMPLE 3

N,N-dimethyl-2-(5,11-dihydro - 10,10 - dioxo-11-methyl-dibenzo[c,f][1,2]thiazepin-5-yloxy)ethylamine hydrogen maleate The chloro intermediate product prepared in Example 2, 3.5 g., and 9 ml. of 2-dimethylaminoethanol with 25 ml. of xylene as reaction medium are refluxed for 3 hrs. The reaction mixture is concentrated in a vacuum and the residue is treated with dilute aqueous hydrochloric acid and ether. The aqueous layer is neutralized with 10% aqueous sodium hydroxide and precipitated material is extracted into ether. The ether solution is washed with water, dried and the solvent removed by evaporation. The residue is dissolved in the minimum quantity of ethyl acetate and one molecular proportion of maleic acid is added to the solution. The hydrogen maleate salt of the desired product crystallizes. It is collected and recrystallized from ethanol, M.P. 164° C.

Analysis.—Calc'd for: $C_{22}H_{26}N_2O_4S$ (percent): C, 56.92; H, 5.05; N, 6.05; S, 6.92. Found (percent): C, 57.17; H, 5.76; N, 6.20; S, 7.16.

EXAMPLE 4

3-(5,11 - dihydro - 10,10 - dioxo-11-methyldibenzo[c,f][1,2]thiazepin-5-yloxy)tropane and the hydrogen maleate salt thereof The chloro intermediate product of Example 2, 3 g. and 3.5 g. of tropine with 25 ml. of toluene as reaction medium are refluxed for 3 hrs. The reaction mixture is then concentrated in a vacuum until the solvent and other volatile materials are removed. The residue is treated with dilute aqueous hydrochloric acid, and ether. The aqueous layer is separated and neutralized with aqueous sodium hydroxide. Insoluble material which thereupon separates is dissolved in ether, and the ether solution separated. It is washed several times with water, dried and evaporated, leaving the free base form of the desired product which crystallizes on standing, M.P. 157° C. It is recrystallized from ethyl acetate, M.P. 162° C.

Analysis.—Calc'd for: $C_{22}H_{26}N_2O_3S$ (percent): C, 66.30; H, 6.57; N, 7.02. Found (percent): C, 66.32; H, 6.62; N, 6.97.

The base is converted to the hydrogen maleate salt by treatment in ethyl acetate solution with one molecular proportion of maleic acid. This material is recrystallized from ethanol, M.P. 215° C.

Analysis.—Calc'd for: $C_{26}H_{30}N_2O_7S$ (percent): C, 60.68; H, 5.97; N, 5.44. Found (percent): C, 60.97; H, 5.97; N, 5.39.

EXAMPLES 5–17

Products of Formula I with various Z substituents

The procedure of Example 4 is applied to various substituted aminoalkanol starting materials to prepare the series of products shown in Table I. These substances are examples of products of Formula I, and have the Z substituents shown in the table. $R^1$, $R^8$, and $R^9$ are hydrogen, $R^{11}$ is methyl. The products are shown by formula. The carbinol reactant appropriate to the preparation of each is listed.

TABLE I.—EXAMPLES 5-17

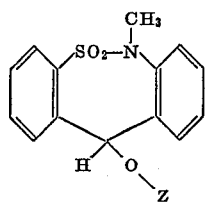

| Example No. | Aminocarbinol reactant | Z-substituent |
| --- | --- | --- |
| 5 | 5-dimethyaminopentan-1-ol | $(CH_3)_2NCH_2(CH_2)_3CH_2-$ |
| 6 | 3-morpholinopropan-1-ol | O⟨ ⟩NCH$_2$CH$_2$CH$_2-$ |
| 7 | 1-methyl-3-pyrrolidylmethanol | (pyrrolidine)-CH$_2-$, N-CH$_3$ |
| 8 | 1-methyl-1,4,5,6-tetrahydro-2-pyrimidylmethanol | $-CH_2-$(tetrahydropyrimidyl, N-CH$_3$) |
| 9 | 3-dimethylaminobutan-1-ol | $(CH_3)_2NCHCH_2CH_2-$ with CH$_3$ branch |
| 10 | 3-thiomorpholinopropan-1-ol | S⟨ ⟩N$-$CH$_2$CH$_2$CH$_2-$ |
| 11 | 8-ethylnortropine | (nortropine, N-C$_2$H$_5$) |
| 12 | 3-(1-methyl-4-piperazinyl)propan-1-ol | CH$_3-$N⟨ ⟩N$-$CH$_2$CH$_2$CH$_2-$ |
| 13 | 3-(pyrrolidyl)propan-1-ol | ⟨pyrrolidyl⟩NCH$_2$CH$_2$CH$_2-$ |
| 14 | 3-piperidinopropan-1-ol | ⟨piperidino⟩NCH$_2$CH$_2$CH$_2-$ |
| 15 | 1-methyl-4-piperidinol | CH$_3$N⟨piperidinyl⟩ |
| 16 | 3-quinuclidinol | (quinuclidinyl) |
| 17 | 2-(di-n-butylamino)ethanol | $(C_4H_9)_2NCH_2CH_2-$ |

EXAMPLE 18

N-methyl - 3 - (5,11-dihydro-10,10-dioxo-11-methyl dibenzo[c,f][1,2]thiazepine - 5 - yloxy)-1-propylamine hydrochloride (a) Preparation of N-Formyl intermediate. 3-(N-Formyl-N-methylamino)propan-1-ol and 5-chloro-5,11-dihydro-10,10-dioxo-11 - methyldibenzo[c,f][1,2]thiazepine (Example 2) are allowed to react under the conditions of Example 3. The resulting formamide derivative is isolated and transformed into the desired product according to the method in the next paragraph.

(b) Hydrolysis. The formamide derivative prepared in the preceding paragraph, 1.5 g., is refluxed in 50 ml. of butanol with 1.5 g. of potassium hydroxide. A nitrogen atmosphere is maintained over the reaction mixture. The solvent is then removed by distillation and the residue is dissolved in ether. The ether solution is extracted with dilute aqueous hydrochloric acid and the product precipitated from the aqueous extract by neutralization with sodium hydroxide. The precipitated base is extracted into ether, the ethereal extract dried over potassium carbonate, and the hydrochloride salt of the product precipitated from the solution by treatment with anhydrous hydrogen chloride.

EXAMPLES 19–38

Various N,N - dimethyl-2-(5,11-dihydro-10,10-dioxo-R$^1$, R$^8$, R$^9$, and R$^{11}$-substituted-dibenzo[c,f][1,2]-thiazepin-5-yloxy)ethylamines The substituted 5-chloro-5,11-dihydro-10,10-dioxo-dibenzo[c,f][1,2]thiazepines listed as starting materials in Table II are prepared by the methods of Examples 1 and 2 from the correspondingly substituted 5,11-dihydro-5,10,10-trioxodibenzo[c,f][1,2]-thiazepines. The latter are known compounds prepared as described in U.S. patent application Ser. No. 599,737 filed Dec. 7, 1966. The starting materials listed in Table II are converted to the designated therapeutically active products of this invention by substitution in the procedure of Example 3. The identity of these products is shown by formula in the table.

TABLE II.—EXAMPLES 19-38

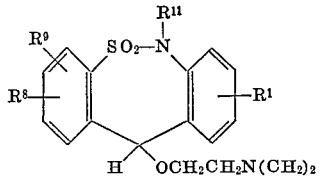

| Example No. | Starting material | Product $R^1$-$R^8$-$R^9$-$R^{11}$ |
|---|---|---|
| 19 | 5-chloro-5,11-dihydro-10,10-dioxo-11-ethyl-dibenzo[c,f][1,2]thiazepine | $R^{11}$=ethyl; $R^1$, $R^8$ and $R^9$=H. |
| 20 | 11-butyl-5-chloro-5,11-dihydro-10,10-dioxodibenzo[c,f][1,2]thiazepine | $R^{11}$=butyl; $R^1$, $R^8$ and $R^9$=H. |
| 21 | 5-chloro-5,11-dihydro-10,10-dioxo-11-isopropyl-dibenzo[c f][1,2]thiazepine | $R^{11}$=isopropyl; $R^1$, $R^8$ and $R^9$=H. |
| 22 | 5-chloro-5,11-dihydro-10,10-dioxo-11-methyl-7-nitrodibenzo[c,f][1,2]thiazepine | $R^8$=7-$NO_2$; $R^1$, $R^9$=H; $R^{11}$=$CH_3$. |
| 23 | 5-chloro-5,11-dihydro-10,10-dioxo-7-methoxy-11-methyldibenzo[c,f][1,2]thiazepine | $R^8$=7-$CH_3O$; $R^1$, $R^9$=H; $R^{11}$=$CH_3$. |
| 24 | 9-bromo-5-chloro-5,11-dihydro-10,10-dioxo-11-methyldibenzo[c,f][1,2]thiazepine | $R^9$=9-Br; $R^1$, $R^8$=H; $R^{11}$=$CH_3$. |
| 25 | 5,11-dihydro-10,10-dioxo-11-methyl-5,6,9-trichlorodibenzo[c,f][1,2]thiazepine | $R^8$, $R^9$=6,9-$Cl_2$; $R^1$=H; $R^{11}$=$CH_3$. |
| 26 | 5-chloro-5,11-dihydro-10,10-dioxo-11-methyl-8-nitrodibenzo[c,f][1,2]thiazepine | $R^8$=8-$NO_2$; $R^1$, $R^9$=H; $R^{11}$=$CH_3$. |
| 27 | 5,7-dichloro-5,11-dihydro-10,10-dioxo-11-methyl-dibenzo[c,f][1,2]thiazepine | $R^8$=7-Cl; $R^1$, $R^9$=H; $R^{11}$=$CH_3O$. |
| 28 | 5,6-dichloro-5,11-dihydro-10,10-dioxo-11-methyl-dibenzo[c,f][1,2]thiazepine | $R^8$=6-Cl; $R^1$, $R^9$=H; $R^{11}$=$CH_3$. |
| 29 | 5-chloro-5,11-dihydro-10,10-dioxo-8-fluoro-11-methyldibenzo[c,f][1,2]thiazepine | $R^8$=8-F; $R^1$, $R^9$=H; $R^{11}$=$CH_3$. |
| 30 | 5-chloro-5,11-dihydro-10,10-dioxo-7-fluoro-11-methyldibenzo[c,f][1,2]thiazepine | $R^8$=7-F; $R^1$, $R^9$=H; $R^{11}$=$CH_3$. |
| 31 | 5-chloro-5,11-dihydro-7,11-dimethyl-10,10-dioxo-dibenzo[c,f][1,2]thiazepine | $R^8$=7-$CH_3$; $R^1$, $R^9$=H; $R^{11}$=$CH_3$. |
| 32 | 5,11-dihydro-10,10-dioxo-11-methyl-5,6,7-trichlorodibenzo[c,f][1,2]thiazepine | $R^8$, $R^9$=6,7-$Cl_2$; $R^1$=H; $R^{11}$=$CH_3$. |
| 33 | 8-bromo-5-chloro-5,11-dihydro-10,10-dioxo-11-methyldibenzo[c,f][1,2]thiazepine | $R^8$=8-Br; $R^1$, $R^9$=H; $R^{11}$=$CH_3$. |
| 34 | 7-bromo-5-chloro-5,11-dihydro-10,10-dioxo-11-methyldibenzo[c,f][1,2]thiazepine | $R^8$=7-Br; $R^1$, $R^9$=H; $R^{11}$=$CH_3$. |
| 35 | 5-chloro-7,8-dibromo-5,11-dihydro-10,10-dioxo-11-methyldibenzo[c,f][1,2]thiazepine | $R^8$, $R^9$=7,8-$Br_2$; $R^1$=H; $R^{11}$=$CH_3$. |
| 36 | 1,5-dichloro-5,11-dihydro-10,10-dioxo-11-methyl-dibenzo[c,f][1,2]thiazepine | $R^1$=1-Cl; $R^8$, $R^9$=H; $R^{11}$=$CH_3$. |
| 37 | 1-bromo-5-chloro-5,11-dihydro-10,10-dioxo-11-methyldibenzo[c,f][1,2]thiazepine | $R^1$=1-Br; $R^8$, $R^9$=H; $R^{11}$=$CH_3$. |
| 38 | 5-chloro-5,11-dihydro-10,10-dioxo-1-fluoro-11-methyldibenzo[c,f][1,2]thiazepine | $R^1$=1-F; $R^8$, $R^9$=H; $R^{11}$=$CH_3$. |

EXAMPLE 39

Alternate preparation of N,N-dimethyl-2-(5,11-dihydro-10,10 - dioxo - 11 - methyldibenzo[c,f][1,2]thiazepin-5 - yloxy)ethylamine.

A solution of 27.5 g. (0.1 mole) of 5,11-dihydro-10,10-dioxo - 5 - hydroxy-11-methyldibenzo[c,f][1,2]thiazepine is dissolved in 300 ml. of toluene is treated with 40 g. of powdered sodium amide. The mixture is stirred during addition of the latter and stirring is continued while the mixture is heated at 80 to 90° C. for a period which is terminated when evolution of ammonia has ceased. The mixture is then cooled to room temperature and treated in drop-wise fashion with 13.0 g. (0.12 mole) of 2-dimethylaminoethylchloride. The mixture is again heated (90 to 100 C.) with stirring for 4 hours, cooled, washed with water to remove precipitated sodium chloride, and extracted with dilute hydrochloric acid. The aqueous acid layer is then separated and neutralized with sodium hydroxide. The product is recovered and converted to the hydrogen maleate salt as described in Example 3. The resulting product is identical with that obtained in Example 3 in all respects.

While several particular embodiments of this invention are shown above, it will be understood that the invention is not to be limited thereto, since many modifications may be made, and it is contemplated by the appended claims to cover any such modifications as fall within the true spirit and scope of the invention.

What is claimed is:
1. A compound having the structural formula

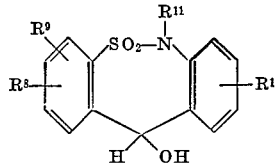

wherein
$R^1$ is located in the 1-, 2-, 3-, or 4-positions and is selected from hydrogen, chlorine, bromine, iodine, fluorine, alkyl of 1 to 4 carbon atoms, and alkoxy of 1 to 4 carbon atoms, $R^8$ and $R^9$ are located in the 6-, 7-, 8-, or 9-positions and are selected from hydrogen, chlorine, fluorine, bromine, nitro, methoxy, and methyl, and
$R^{11}$ is alkyl of 1 to 4 carbon atoms.

2. A compound of claim 1 having the chemical name 5,11 - dihydro - 10,10-dioxo-5-hydroxy-11-methyldibenzo [c,f][1,2]thiazepine.

3. A compound having the formula

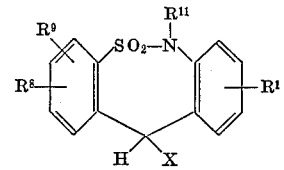

wherein
$R^1$ is located in the 1-, 2-, 3-, or 4-positions and is selected from hydrogen, chlorine, bromine, iodine, fluorine, alkyl of 1 to 4 carbon atoms, and alkoxy of 1 to 4 carbon atoms,
$R^8$ and $R^9$ are located in the 6-, 7-, 8-, or 9-positions and are selected from hydrogen, chlorine, fluorine, bromine, nitro, methoxy, and methyl,
$R^{11}$ is alkyl of 1 to 4 carbon atoms, and X is chlorine, bromine, iodine, alkyl sulfate, alkyl sulfonate, aryl sulfate, or aryl sulfonate having up to 12 carbon atoms.

4. A compound of claim 3 having the chemical name 5 - chloro - 5,11 - dihydro-10,10-dioxo-11-methyldibenzo [c,f][1,2]thiazepine.

References Cited

UNITED STATES PATENTS 3,519,633   7/1970   Weber et al. _____ 260—292
3,542,790   11/1970  Weber et al. _____ 260—293.4

NORMA S. MILESTONE, Primary Examiner

C. M. SHURKO, Assistant Examiner

UNITED STATES PATENT OFFICE
CERTIFICATE OF CORRECTION

Patent No. 3,651,087  Dated March 21, 1972

Inventor(s) Abraham Weber and Jacques Jean Frossard

It is certified that error appears in the above-identified patent and that said Letters Patent are hereby corrected as shown below:

Column 1, lines 26-29 are not part of the Abstract and should be inserted after line 35.

line 33, "divsision" should be -- division --

Column 3, line 75, before "1,2]" insert a bracket -- [ --

Column 4, line 33, "alkyl sulfonates" should be -- alkyl sulfonate -- line 61, delete "FORMULA V"

line 65, after "employed" insert -- for --

Column 6, line 62, "$C_{26}H_{30}N_2O_7S$" should be -- $C_{28}H_{30}N_2O_7S$ --

Column 7, in Table I, Example 9, under the heading "Z-substituent", the formula "$(CH_3)_3\overset{|}{N}CHCH_2CH_2-$"
$\phantom{xxxxxxxxxxxxxxxxxxxxxxxxxxxxxxxxxxxxxxxxxxxx}CH_3$ should be -- $(CH_3)_2\overset{|}{N}CHCH_2CH_2-$ --
$\phantom{xxxxxxxxxxxx}CH_3$ Patent No. 3,651,087                               Dated March 21, 1972

Column 7, in Table I, Example 12, under the heading "Z-substituent", the formula "CH-NN-CH$_2$CH$_2$CH$_2$-" should be -- CH$_3$-NN-CH$_2$CH$_2$CH$_2$- --

Column 8, line 65, delete the hyphen after "[1,2]"

line 72, delete the hyphen after "[1,2]"

Columns 9 and 10, in Table II, Example 21 under the heading "Starting material", "[c f]" should be -- [c,f] -- in the last column of Table II, opposite Example 27, "R11=CH$_3$O" should be -- R11=CH$_3$ --

Column 9, line 50, "(90 to 100 C.)" should be -- (90 to 100° C) --

Signed and sealed this 25th day of July 1972.

(SEAL)
Attest:

EDWARD M. FLETCHER, JR.                ROBERT GOTTSCHALK
Attesting Officer                       Commissioner of Patents